US008457643B2

(12) United States Patent
Kumpula et al.

(10) Patent No.: US 8,457,643 B2
(45) Date of Patent: Jun. 4, 2013

(54) TAKING CONTROL OF SUBSCRIBER TERMINAL

(75) Inventors: Juha Kumpula, Oulu (FI); Jukka Lotvonen, Kempele (FI); Jorma Ikäheimo, Oulu (FI); Taisto Niiranen, II (FI)

(73) Assignee: Exfo Oy, Oulu (FI)

( * ) Notice: Subject to any disclaimer, the term of this patent is extended or adjusted under 35 U.S.C. 154(b) by 365 days.

(21) Appl. No.: 12/908,135

(22) Filed: Oct. 20, 2010

(65) Prior Publication Data
US 2011/0151909 A1 Jun. 23, 2011

(30) Foreign Application Priority Data

Dec. 18, 2009 (EP) ..................................... 09179947

(51) Int. Cl.
*H04W 36/00* (2009.01)
(52) U.S. Cl.
USPC ............ 455/444; 455/436; 455/443; 455/522
(58) Field of Classification Search
USPC ................. 455/424, 426.1, 435.2, 436–444, 455/449, 450, 545, 418, 422.1, 423, 454, 455/522, 67.11, 68–70; 370/328
See application file for complete search history.

(56) References Cited

U.S. PATENT DOCUMENTS

| 6,256,500 | B1 * | 7/2001 | Yamashita | 455/441 |
|---|---|---|---|---|
| 8,195,234 | B2 * | 6/2012 | Chang et al. | 455/558 |
| 2002/0042276 | A1 * | 4/2002 | Hakalin et al. | 455/453 |
| 2004/0005897 | A1 * | 1/2004 | Tomoe et al. | 455/450 |
| 2005/0037798 | A1 * | 2/2005 | Yamashita et al. | 455/525 |
| 2005/0102420 | A1 * | 5/2005 | Major et al. | 709/238 |
| 2006/0019665 | A1 * | 1/2006 | Aghvami et al. | 455/444 |
| 2007/0004445 | A1 * | 1/2007 | Dorsey et al. | 455/525 |
| 2007/0147621 | A1 | 6/2007 | Barkan et al. | |
| 2007/0161374 | A1 | 7/2007 | Kienstra, III et al. | |
| 2007/0254620 | A1 * | 11/2007 | Lindqvist et al. | 455/403 |
| 2008/0020749 | A1 | 1/2008 | Delaveau et al. | |
| 2009/0111499 | A1 * | 4/2009 | Bosch et al. | 455/522 |
| 2009/0136036 | A1 * | 5/2009 | Okada | 380/272 |
| 2009/0253421 | A1 * | 10/2009 | Camp et al. | 455/418 |

(Continued)

FOREIGN PATENT DOCUMENTS

EP 1 051 053 A2 11/2000
EP 1 995 985 A1 11/2008

OTHER PUBLICATIONS

European Communication dated Sep. 29, 2011 for Application No. EP 09 179 947.8-1249.

(Continued)

*Primary Examiner* — Dominic E Rego
(74) *Attorney, Agent, or Firm* — Ladas & Parry LLP

(57) ABSTRACT

Taking control of a subscriber terminal is disclosed. An apparatus comprises a processor configured to cause the apparatus: to control a stand-alone base station so that an emulated cell of a cellular radio system is formed by transmitting a control channel with information of a real cell and with such transmission power that a subscriber terminal having an ongoing connection with a serving cell base station is caused to measure reception of the stand-alone base station as being better than reception of the serving cell base station; and to control the stand-alone base station to perform cell reselection with the subscriber terminal so that the ongoing radio connection with the serving cell base station is transferred to continue with the stand-alone base station.

13 Claims, 5 Drawing Sheets

U.S. PATENT DOCUMENTS

| | | | |
|---|---|---|---|
| 2009/0280819 A1* | 11/2009 | Brisebois et al. | 455/446 |
| 2009/0305702 A1* | 12/2009 | Toppinen et al. | 455/435.2 |
| 2009/0310527 A1* | 12/2009 | Rao et al. | 370/315 |
| 2010/0027431 A1* | 2/2010 | Morrison et al. | 370/252 |
| 2010/0046524 A1* | 2/2010 | Rune et al. | 370/395.53 |
| 2010/0144338 A1* | 6/2010 | Kim et al. | 455/422.1 |
| 2010/0260052 A1* | 10/2010 | Cho et al. | 370/241 |
| 2010/0279703 A1* | 11/2010 | Morita et al. | 455/452.2 |
| 2010/0291927 A1* | 11/2010 | Wu et al. | 455/435.3 |
| 2011/0044244 A1* | 2/2011 | Etemad | 370/328 |
| 2011/0053599 A1* | 3/2011 | Hsu et al. | 455/436 |
| 2011/0096734 A1* | 4/2011 | Damnjanovic et al. | 370/329 |
| 2011/0275361 A1* | 11/2011 | Yavuz et al. | 455/422.1 |
| 2011/0319076 A1* | 12/2011 | Ramasamy et al. | 455/434 |
| 2012/0322451 A1* | 12/2012 | Hsu | 455/436 |

OTHER PUBLICATIONS

Barkan, E., et al., "Instant Ciphertext-Only Cryptanalysis of GSM Encrypted Communication", Technion-Computer Science Department—Technical Report CS-2006-07-2006, pp. 1-34.

European Search Report issued on May 7, 2010 from the European Patent Office in connection with corresponding application EP 09 17 9947.

Espacenet English abstract of EP 1 051 053 A2.

* cited by examiner

TAKING CONTROL OF SUBSCRIBER TERMINAL

FIELD

The invention relates generally to taking control of a subscriber terminal and specifically to an apparatus, a method, and a computer-readable medium used for taking the control.

BACKGROUND

Taking control of a subscriber terminal is useful in some situations, such as in a situation where criminals are using the subscriber terminal for communication. Only persons representing official authority may perform such operations.

BRIEF DESCRIPTION

The present invention seeks to provide an improved apparatus, an improved method, and an improved computer-readable medium for taking control.

According to an aspect of the present invention, there is provided an apparatus as specified in claim 1.

According to another aspect of the present invention, there is provided a method as specified in claim 8.

According to another aspect of the present invention, there is provided a computer-readable medium as specified in claim 15.

LIST OF DRAWINGS

Figure 1:
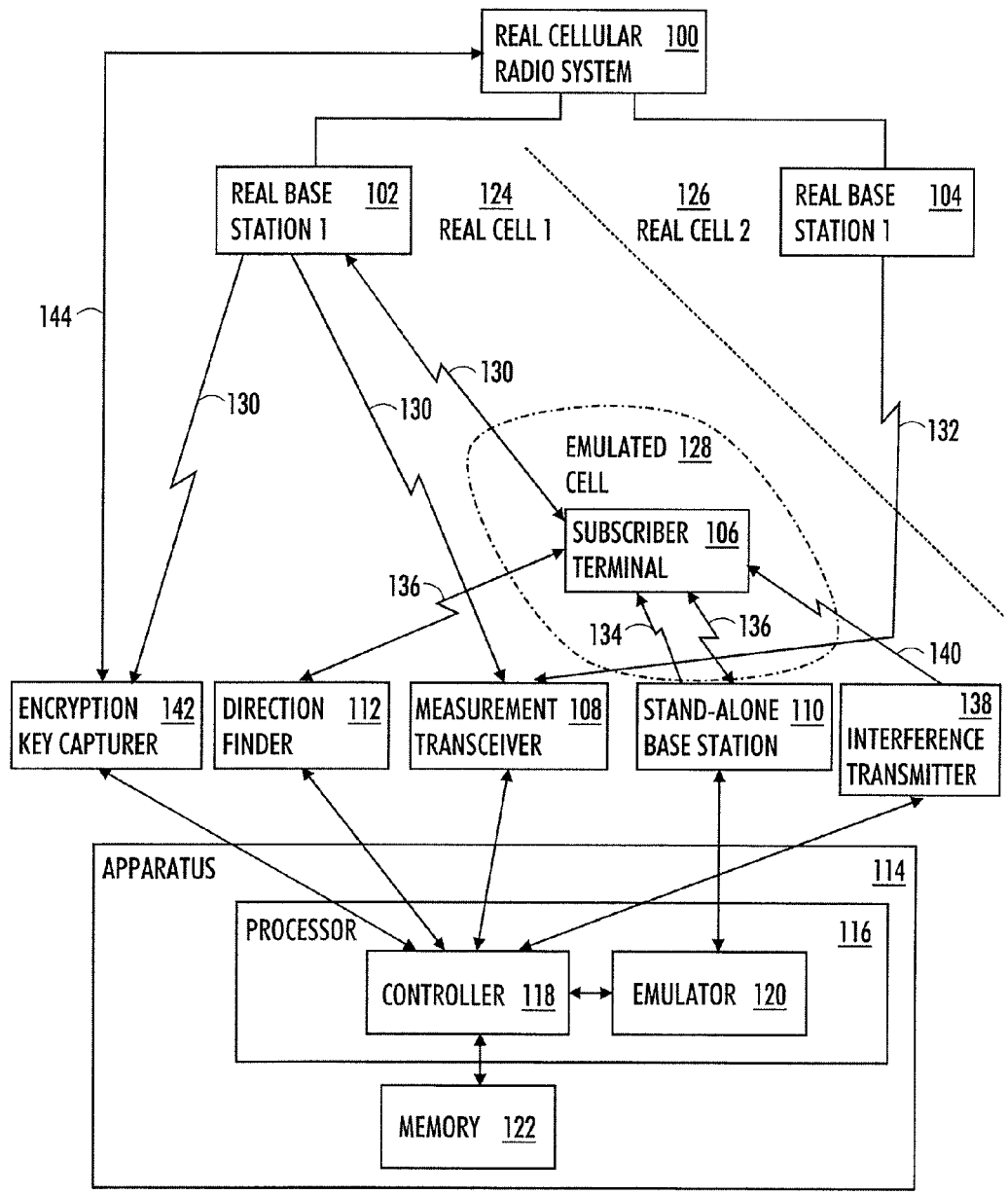
Figure 2:
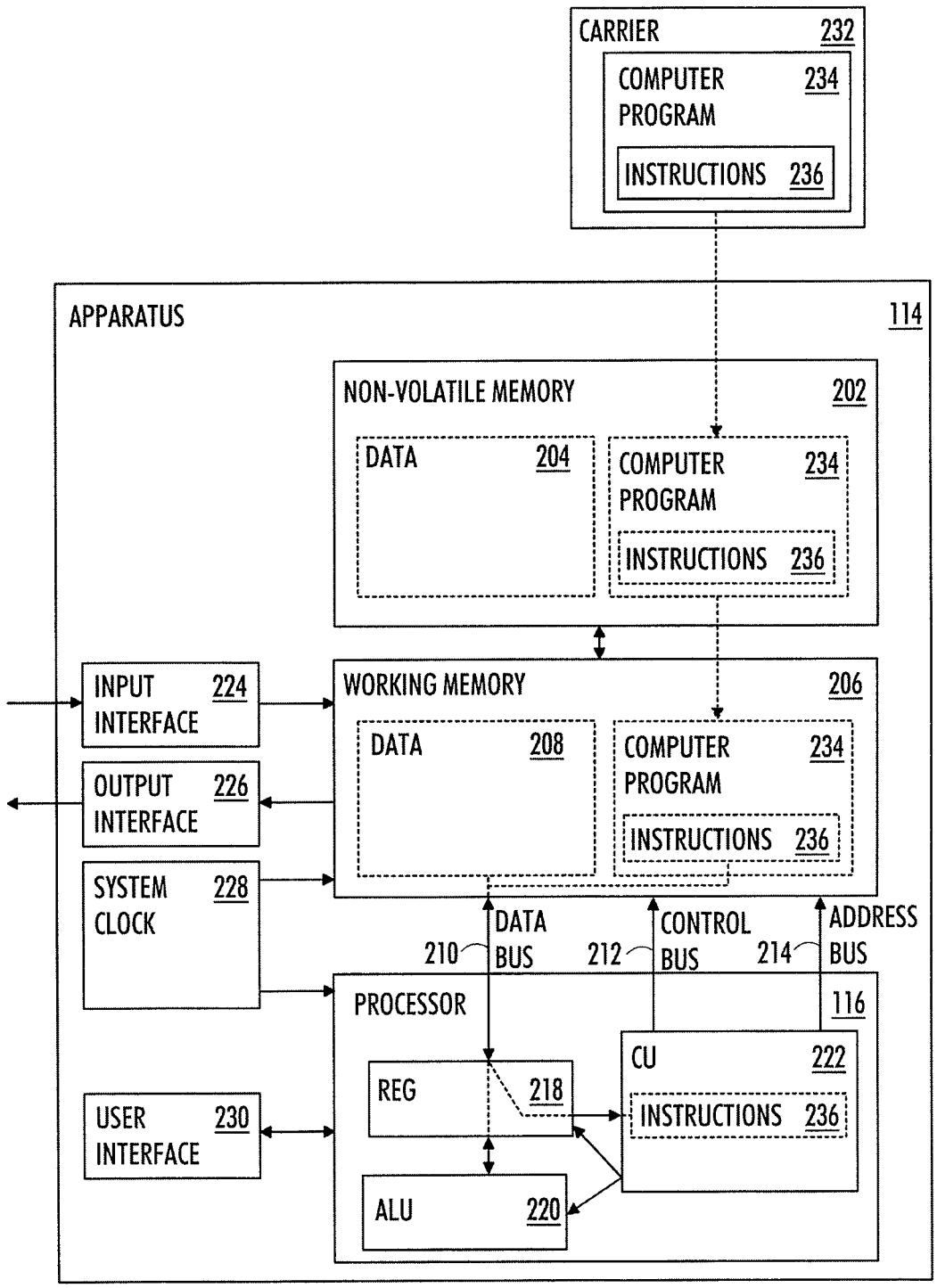

Embodiments of the present invention are described below, by way of example only, with reference to the accompanying drawings, in which FIGS. 1 and 2 illustrate various embodiments of an apparatus; and FIGS. 3, 4, 5 and 6 illustrate various embodiments of a method.

DESCRIPTION OF EMBODIMENTS

The following embodiments are exemplary. Although the specification may refer to "an" embodiment(s) in several locations, this does not necessarily mean that each such reference is to the same embodiment(s), or that the feature only applies to a single embodiment. Single features of different embodiments may also be combined to provide other embodiments. The present invention is applicable to any cellular radio system that supports the functionality that will be described in the following. The protocols and specifications of cellular radio systems develop rapidly. Such development may require extra changes to an embodiment. Therefore, all words and expressions should be interpreted broadly and they are intended to illustrate, not to restrict, the embodiment.

FIGS. 1 and 2 only show some elements and functional entities, all being logical units whose implementation may differ from what is shown. The connections shown in FIGS. 1 and 2 are logical connections; the actual physical connections may be different. Interfaces between the various elements may be implemented with suitable interface technologies, such as a message interface, method interface, sub-routine call interface, block interface, or any means enabling communication between functional sub-units. It should be appreciated that apparatuses may also comprise other units. However, they are irrelevant to the actual invention and, therefore, they need not be discussed in more detail here. It is also to be noted that although some elements are depicted as separate (apparatus 114, direction finder 112, measurement transceiver 108, stand-alone base station 110, interference transmitter 138, encryption key capturer 142), some of them may be integrated into a single physical element.

FIG. 1 illustrates two base stations 102, 104, both being part of a real cellular radio system 100. 'Real' refers to the fact that the cellular radio system 100 is authorized by the authorities and it provides continuous service for the users. Both base stations 102, 104 form real cells 124, 126.

The cellular radio system 100 may operate according to the GSM (Global System for Mobile Communications), WCDMA (Wideband Code Division Multiple Access), WLAN (Wireless Local Area Network) standard, or according to any other suitable standard/non-standard/proprietary wireless communication technique. Taking control of a subscriber terminal 106 may operate within one cellular radio system 100, or it may be implemented simultaneously to more than one cellular radio system 100, i.e. more than one stand-alone base station 110 may be needed to form more than one emulated cell 128. The stand-alone base station 110 may operate as a wideband code division multiple access cell, and, if the subscriber terminal 106 switches from the wideband code division multiple access cell to a time division multiple access cell, the stand-alone base station 110 or another stand-alone base station (not illustrated in FIG. 1) may emulate that time division multiple access cell.

A subscriber terminal 106 is in the real cell 124 formed by the base station 102. The subscriber terminal 106 is a piece of equipment or a device that is configured to associate the subscriber terminal 106 and its user with a subscription and allows a user to interact with the cellular radio system 100, i.e. the subscriber terminal 106 is capable of requesting service from the cellular radio system 100. The subscriber terminal 106 presents information to the user and allows the user to input information. In other words, the subscriber terminal 106 may be any terminal capable of wirelessly receiving information from and/or wirelessly transmitting information to the cellular radio system 100. The subscriber terminal 100 may refer to a portable mobile communication device operating with or without a subscriber identification module (SIM), including, but not limited to, devices of the following type: mobile station, mobile phone, smartphone, personal digital assistant (PDA), user equipment, or any other portable communication device possibly including computer functionalities or functionalities of other data processing devices.

In FIG. 1, the subscriber terminal 106 has an ongoing radio connection 130 with the base station 102 of the serving cell 124.

The actual apparatus 114 for taking control of the subscriber terminal 106 is also illustrated in FIG. 1. The apparatus 114 comprises a processor 116 configured to cause the apparatus 114: to control a stand-alone base station 110 so that an emulated cell 128 of the cellular radio system 100 is formed by transmitting 134 a control channel with information of the real masqueraded cell 126 and with such transmission power that the subscriber terminal 106 having the ongoing connection 130 with the serving cell 124 base station 102 is caused to measure reception 134 of the stand-alone base station 110 as being better than reception 130 of the serving cell 124 base station 102; and to control the stand-alone base station 110 to perform cell reselection with the subscriber terminal 106 so that the ongoing radio connection 130 with the serving cell 124 base station 102 is transferred to continue 136 with the stand-alone base station 110. The cell reselection may take place while the subscriber terminal 106 is in the so-called idle mode, in which there is no active telephone or data transfer connection between the subscriber terminal 106 and the base station, or it may take place during an ongoing, or active, connection. Here the latter situation is dealt with as the connection 130 is active; such transfer of the ongoing connection 130 from one base station 102 to another 110 in connection with the cell reselection may also be called 'handover'.

In effect, the stand-alone base station 110 is configured to set parameters of the formed emulated cell 128 for masquerading a neighbour cell 126 so that the emulated cell 128 becomes a tempting destination for a handover. The actual cell reselection decision may be made by the real cellular radio system 100, by a controller for example, on the basis of the measurement report describing the reception power of the neighbour cells transmitted by the subscriber terminal 106. It is to be noted that the ongoing original radio connection 130 as well as the transferred radio connection 136 may operate according to various protocols and/or techniques, including packet-switched and/or circuit-switched connections.

The stand-alone base station 110 may be implemented just like the real base station 102. 'Stand-alone' refers to the fact that the stand-alone base station 110 is not part of the real cellular radio system 100 and it does not provide continuous service for the users. The purpose of the stand-alone base station 110 is to take control of the subscriber terminal 106.

As illustrated in FIG. 1, the functionalities of the apparatus 114 may be divided into two parts in the processor 116: an emulator 120, which simulates the necessary network functions (a radio network controller, for example) of the cellular radio system 100 towards the stand-alone base station 110 and the subscriber terminal 106, and a controller 118, which controls the emulator 120 and receives information about the cellular radio system 100.

The controller 118 may obtain the information about the cellular radio system 100 from a suitable source: from another apparatus via a communication interface (not illustrated in FIG. 1), from a user of the apparatus 114 via its user interface (not illustrated in FIG. 1), or from a measurement transceiver 108. In an embodiment, the processor 116 is further configured to cause the apparatus 114 to control an encryption key capturer 142 to capture an encryption key of the ongoing radio connection 130 between the subscriber terminal 106 and the serving cell 124 base station 102. As illustrated in FIG. 1, the encryption key capturer may capture the encryption key from the air interface 130 between the serving cell 124 base station 102 and the subscriber terminal 106, or it may capture internal traffic 144 from the cellular radio network 100, from the core network, for example, such as the internal traffic between the base station 102 and its controller (base station controller, or radio network controller, not illustrated, for example). Besides the encryption key, also other information relating to the subscriber terminal 106 may be captured: TMSI (Temporary Mobile Subscriber Identity), IMSI (International Mobile Subscriber Identity), IMEI (International Mobile Equipment Identity), for example.

The measurement transceiver 108 may be implemented on a platform provided by a normal mobile telephone. The measurement features/parts may easily be implemented on top of the platform with suitable software and hardware components. All modifications and configurations required for implementing functionality may be performed as routines which may be implemented as added or updated software routines, application circuits (ASIC) and/or programmable circuits, for example.

The processor 116 may further be configured to cause the apparatus 114 to control the measurement transceiver 108 to measure 130, 132 real cells 124, 126 of the cellular radio system 100, and to select one of the measured real cells 124, 126 as the emulated cell 128. The measurement transceiver 108 may be configured to measure parameters of a serving cell 124 required for performing cell reselection to a neighbour cell of the serving cell, and to camp in the neighbour 126 cells in order to store reception quality and a neighbour cell list from the neighbour cells by using the measured parameters. The processor 116 may be configured to cause the apparatus 114 to select as the emulated cell 124 a real cell whose reception power at the measurement transceiver 108 is lower than the reception power of the best received cell at the measurement transceiver 108 and whose location area code (LAC) is the same as the location area code of the best received cell.

Let us suppose that the reception power of the real cell 124 is higher than the reception power of the real cell 126 at the measurement transceiver 108. Let us also suppose that both real cells 124 and 126 have the same location area code. With these suppositions, the processor 116 will select the real cell 126 as the emulated cell 128, i.e. the stand-alone base station 110 will form the emulated cell 128 by transmitting a control channel 134 with information of the real cell 126.

The stand-alone base station 112 will transmit the control channel 134 with such transmission power that the subscriber terminal 106 measures the reception power of the emulated cell 128 as being higher than the reception power of the real cell 124.

In an embodiment, the processor 116 is further configured to cause the apparatus 114 to control the stand-alone base station 110 so that information transmitted in the control channel is modified in order to better force the subscriber terminal 106 to perform the cell reselection in the emulated cell 128.

In an embodiment, the processor 116 is further configured to cause the apparatus 114 to control an interference transmitter 138 to interfere with 140 the serving cell 124 base station 102 so that the subscriber terminal 106 having the ongoing connection 130 with the serving cell 124 base station 102 is caused to measure reception 134 of the stand-alone base station 110 as being better than reception 130 of the serving cell 124 base station 102. The signal 140 transmitted by the interference transmitter 138 interferes with the signal 136 transmitted by the base station 102 so that the transmission power for the signal 134 of the stand-alone base station 110 may be kept sufficiently low in order to minimize the harm caused by the stand-alone base station 110 to innocent users.

After the apparatus 114 has taken control of the subscriber terminal 106 various operations may be performed. In an embodiment, the processor 116 is further configured to cause the apparatus 114 to control a direction finder 112 to find out the geographical location of the subscriber terminal 106 utilizing the transferred ongoing radio connection 136 with the subscriber terminal 106. The stand-alone base station 110 may also be used as the direction finder 112. A bearing to the subscriber terminal 106 may be taken by turning the directional antenna of the stand-alone base station 110. The subscriber terminal 106 is in the direction wherefrom measurement reports indicate maximum reception level. The measurement reports of the subscriber terminal 106 report how much power it uses to keep a set SIR target. The lower the power value, the better the antenna is directed towards the subscriber terminal 106. The report values may be presented in the user interface so that the highest bars are reached with the lowest power values. The roundtrip time measurement may also be started for estimating the distance to the subscriber terminal 106. In another embodiment, the processor 116 is further configured to cause the apparatus 114 to control the stand-alone base station 110 to disconnect the transferred ongoing radio connection 136 with the subscriber terminal 106. Other possible operations include: finding out the identity of the subscriber terminal 106, routing the transferred ongoing radio connection 136 to the real cellular radio system 100, eavesdropping a call in the transferred ongoing radio connection 136, returning the transferred ongoing radio connection 136 back to the real cell 124.

In an embodiment, the apparatus 114 comprises, besides the processor 116, a memory 122 including computer program instructions, the memory 122 and the computer program instructions configured to, with the processor 116, cause the apparatus 114 to perform the previously described controlling of the stand-alone base station 110.

The apparatus 114 may be of the type utilized in telecommunication testing and measurement. The apparatus 114 may be a measuring device, such as an analyser. The apparatus 114 may, for instance, be a protocol analyser used for measuring the operation of a data transmission system. The apparatus 114 may also be an interface card. The apparatus 114 may also be a computer provided with Microsoft Windows® or some other operating system and dedicated protocol analysis software. The apparatus 114 may further comprise a number of other devices, such as a user interface and communication equipment. The user interface allows controlling the operations of the apparatus 114 and monitoring the operations carried out by the apparatus 114. The user interface may comprise a display and a keyboard, for example. Depending on the apparatus 114, the user interface may comprise various other user interface parts.

In general, the apparatus 114 may be an electronic digital computer, an example embodiment of which is illustrated in FIG. 2. However, it is to be noted that other implementations are also feasible, such as implementations utilizing processors, microprocessors, digital signal processors, programmable circuits, field-programmable gate arrays (FPGA), controllers, application-specific integrated circuits (ASIC), and/or integrated circuits (IC) etc. so that the implementation may comprise hardware alone or a combination of hardware and software.

The electronic digital computer 114 may comprise, besides the processor 116, a working memory 206, and a system clock 228. Furthermore, the computer 114 may comprise a number of peripheral devices. In FIG. 2, some peripheral devices are illustrated: a non-volatile memory 202, an input interface 224, an output interface 226, and a user interface 230 (such as a pointing device, a keyboard, a display, etc.). Naturally, the computer 114 may comprise a number of other peripheral devices, not illustrated here for the sake of clarity.

The system clock 228 constantly generates a stream of electrical pulses, which cause the various transferring operations within the computer 114 to take place in an orderly manner and with specific timing.

Depending on the processing power needed, the computer 114 may comprise several (parallel) processors 116, or the required processing may be distributed amongst a number of computers 114. The computer 114 may be a laptop computer, a personal computer, a server computer, a mainframe computer, or any other suitable computer. As the processing power of portable communications terminals, such as mobile phones, is constantly increasing, the functionality of apparatus 114 may be implemented in them as well.

The term 'processor' refers to a device that is capable of processing data. The processor 116 may comprise an electronic circuit or electronic circuits implementing the required functionality, and/or a microprocessor or microprocessors running computer program 234 instructions 236 implementing the required functionality. When designing the implementation, a person skilled in the art will consider the requirements set for the size and power consumption of the apparatus, the necessary processing capacity, production costs, and production volumes, for example. The electronic circuit may comprise logic components, standard integrated circuits, application-specific integrated circuits (ASIC), and/or other suitable electronic structures.

The microprocessor 116 implements functions of a central processing unit (CPU) on an integrated circuit. The CPU 116 is a logic machine executing computer program 234 instructions 236. The program instructions 236 may be coded as a computer program 234 using a programming language, which may be a high-level programming language, such as C, or Java, or a low-level programming language, such as a machine language, or an assembler. The CPU 116 may comprise a set of registers 218, an arithmetic logic unit (ALU) 220, and a control unit (CU) 222. The control unit 222 is controlled by a sequence of program instructions 236 transferred to the CPU 116 from the working memory 206. The control unit 222 may contain a number of microinstructions for basic operations. The implementation of the microinstructions may vary, depending on the CPU 116 design. The microprocessor 116 may also have an operating system (a general purpose operating system, a dedicated operating system of an embedded system, or a real-time operating system, for example), which may provide the computer program 234 with system services.

There may be three different types of buses between the working memory 206 and the processor 116: a data bus 210, a control bus 212, and an address bus 214. The control unit 222 uses the control bus 212 to set the working memory 206 in two states, one for writing data into the working memory 206, and the other for reading data from the working memory 206. The control unit 222 uses the address bus 214 to send to the working memory 206 address signals for addressing specified portions of the memory in writing and reading states. The data bus 210 is used for transferring data 208 from the working memory 206 to the processor 116 and from the processor 116 to the working memory 206, and for transferring the instructions 236 from the working memory 206 to the processor 116.

The working memory 206 may be implemented as a random-access memory (RAM), where the information is lost after the power is switched off. The RAM is capable of returning any piece of data in a constant time, regardless of its physical location and whether or not it is related to the previous piece of data. The data may comprise data 208 relating to taking control of the subscriber terminal, any temporary data needed during the processing, and computer 234 program instructions 236 etc.

The non-volatile memory 202 retains the stored information even when not powered. Examples of non-volatile memory include read-only memory (ROM), flash memory, magnetic computer storage devices such as hard disk drives, and optical discs.

An embodiment provides a computer-readable medium comprising computer 234 program instructions 236 which, when loaded into the apparatus 114, cause the apparatus 114 to perform the earlier described controlling of the stand-alone base station 110 to form the emulated cell 128 and to perform cell reselection of the subscriber terminal 106 to the emulated cell 128.

The computer program 234 may be in source code form, object code form, or in some intermediate form. The computer program 234 may be stored in a carrier 232, which may be any entity or device capable of carrying the program to the apparatus 114. The carrier 232 may be implemented for example as follows: the computer program 234 may be embodied, besides computer-readable medium, on a computer-readable storage medium, on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 232 may not be the telecommunications signal.

FIG. 2 illustrates that the carrier 232 may be coupled with the apparatus 114, whereupon the program 234 comprising the program instructions 236 is transferred to the non-volatile memory 202 of the apparatus 114. The program 234 with its program instructions 236 may be loaded from the non-volatile memory 202 in the working memory 206. During running of the program 234, the program instructions 236 are transferred via the data bus 210 from the working memory 206 to the control unit 222, wherein usually a portion of the instructions 236 resides and controls the operation of the apparatus 114.

There are many ways to structure the program 234. The operations of the program may be divided into functional modules, sub-routines, methods, classes, objects, applets, macros, etc., depending on the software design methodology and the programming language used. In modern programming environments, there are software libraries, i.e. compilations of ready made functions, which may be utilized by the program for performing a wide variety of standard operations.

The data 204 may have been brought into the non-volatile memory 202 via a memory device (such as a memory card, an optical disk, or any other suitable non-volatile memory device) or via a telecommunications connection (via Internet, or another wired/wireless connection). The input interface 224 and the output interface 226 may be a suitable communication bus, such as USB (Universal Serial Bus) or some other serial/parallel bus, operating in a wireless/wired fashion. The interface 224, 226 may be directly coupled with other parts, or there may be a telecommunications connection between the interface 224, 226 and the other parts.

Figure 3:
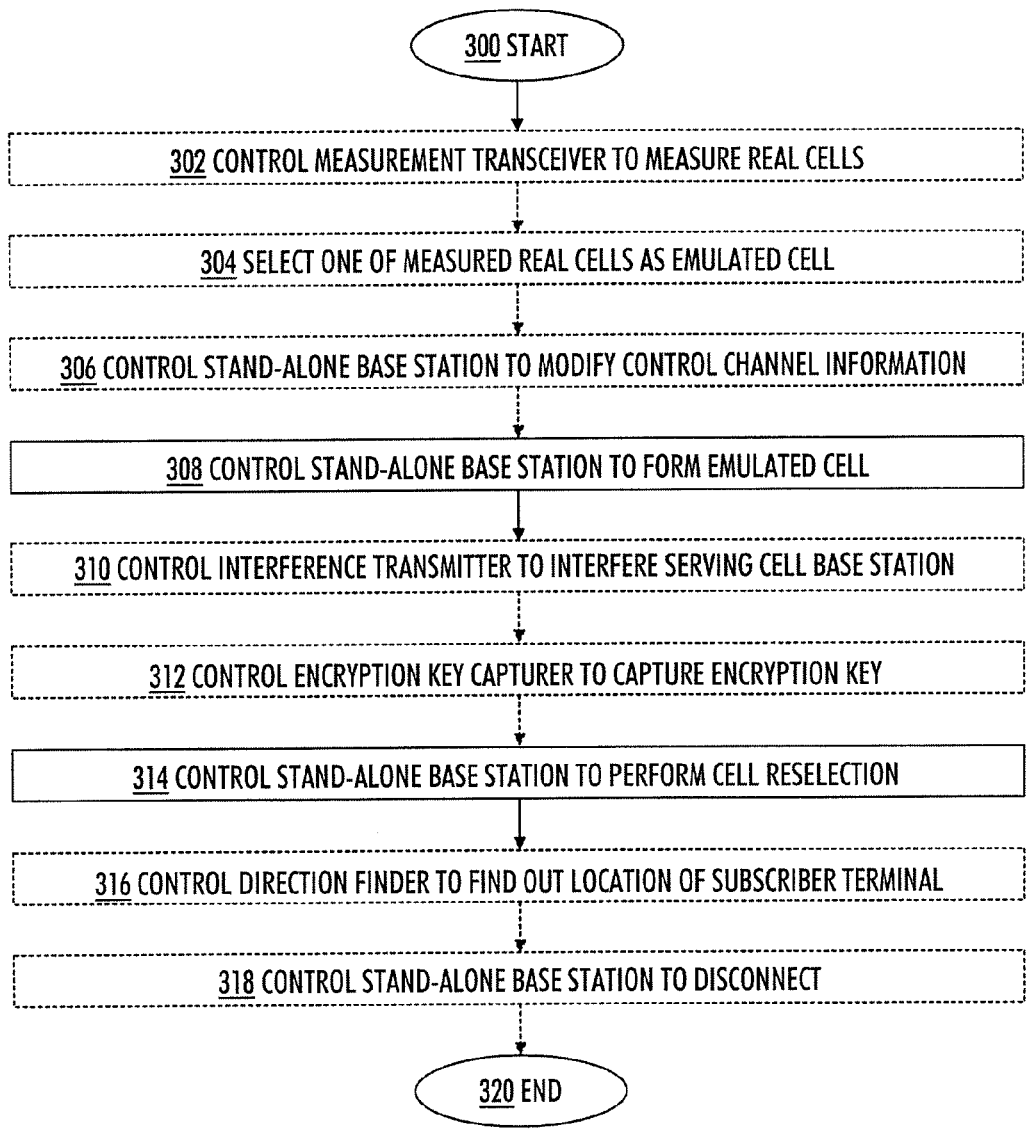

Next, a method will be described with reference to FIG. 3. Operations are in no absolute chronological order, and some of the operations may be performed simultaneously or in an order differing from the given one. Other functions, not described in this application, may also be executed between the operations or within the operations. Some of the operations or parts of the operations may also be left out or replaced by a corresponding operation or part of the operation. The method starts in 300. In 308, a stand-alone base station is controlled so that an emulated cell of a cellular radio system is formed by transmitting a control channel with information of a real cell and with such transmission power that a subscriber terminal having an ongoing connection with a serving cell base station is caused to measure reception of the stand-alone base station as being better than reception of the serving cell base station. In 314, the stand-alone base station is controlled to perform cell reselection with the subscriber terminal so that the ongoing radio connection with the serving cell base station is transferred to continue with the stand-alone base station. The method ends in 320. The embodiments of earlier described apparatuses may also be used to enhance the method. In an embodiment, a computer-readable medium comprises computer program instructions which, when loaded into an apparatus, cause the apparatus to perform the operations.

In an embodiment, the method further comprises: controlling 310 an interference transmitter to interfere with the serving cell base station so that the subscriber terminal having the ongoing connection with the serving cell base station is caused to measure reception of the stand-alone base station as being better than reception of the serving cell base station.

In an embodiment, the method further comprises: controlling 312 an encryption key capturer to capture an encryption key of the ongoing radio connection between the subscriber terminal and the serving cell base station.

In an embodiment, the method further comprises: controlling 318 the stand-alone base station to disconnect the transferred ongoing radio connection with the subscriber terminal.

In an embodiment, the method further comprises: controlling 306 the stand-alone base station so that information transmitted in the control channel is modified to better force the subscriber terminal to perform the cell reselection in the emulated cell.

In an embodiment, the method further comprises: controlling 302 a measurement transceiver to measure real cells of the cellular radio system; and selecting 304 one of the measured real cells as the emulated cell.

In an embodiment, the method further comprises: controlling 316 a direction finder to find out the geographical location of the subscriber terminal utilizing the transferred ongoing radio connection with the subscriber terminal.

Figure 4:
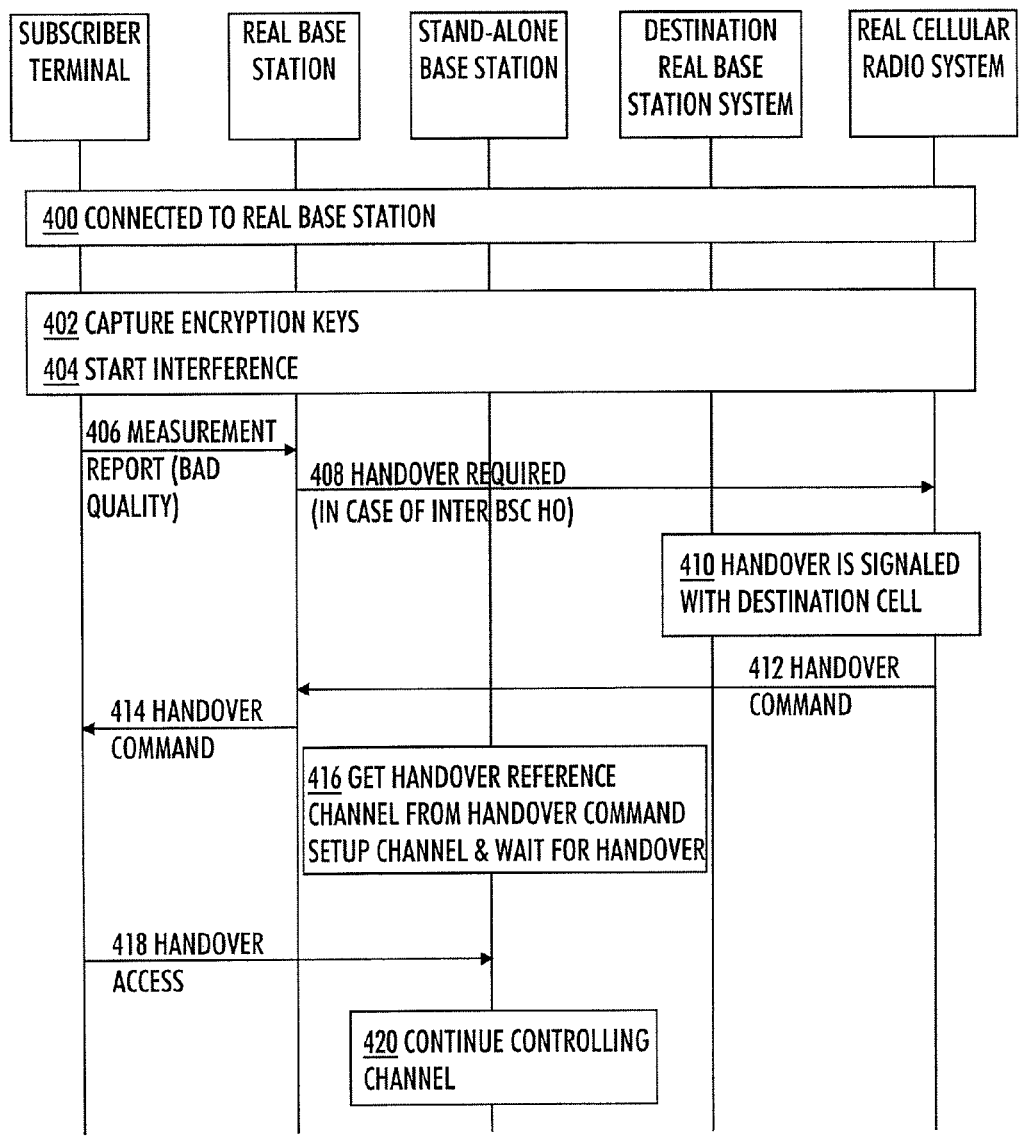

Next, a method for controlling a GSM mobile terminal will be described with reference to FIG. 4. FIG. 4 describes a way to take control of a GSM mobile phone performing inter BSC (Base Station Controller)-intra MSC (Mobile Switching Centre) handover as a part of the method. The same applies with little modifications to all different cell reselection cases. In this method, measurement transceiver is located in a position where it can capture both the subscriber terminal and the real base station transmissions. A controller delivers the captured transmission to an encryption key capturer that uses known attack methods against GSM encryption to find out the used encryption keys. The method starts in 400. As a prerequisite, steps 302, 304, 306 and 308 are executed to set up stand-alone base station. In 400, the mobile terminal has a call connection with the real base station. In 402, an encryption key capturer is used for finding out the encryption keys for the call. In 404, an interference transmitter interferes the call connection so that the mobile terminal receives poor signal quality from the serving cell. In 406, the mobile terminal sends RR MEASUREMENT REPORT showing poor signal quality for the serving cell and good signal quality for the emulated cell. In 408, as a response to measurement reports, the real base station initiates handover to the cell masqueraded by the emulated cell by sending BSSMAP HANDOVER REQUIRED message to MSC. In 410, the cellular radio system prepares a handover with the masqueraded cell. In 412, the cellular radio system has completed handover preparation and commands handover to the masqueraded cell by sending BSSMAP HANDOVER COMMAND MESSAGE. In 414, the serving base station sends RR HANDOVER COMMAND message to the mobile terminal. Measurement transceiver receives the same RR HANDOVER COMMAND; the channels indicated in the handover command are set up into the emulated cell. In 416, the mobile terminal starts handover by sending a HANDOVER ACCESS burst to the emulated cell. In 418, a radio connection is established and the stand-alone base station continues the handover procedure by establishing channels and has control of the call in 420.

Figure 5:
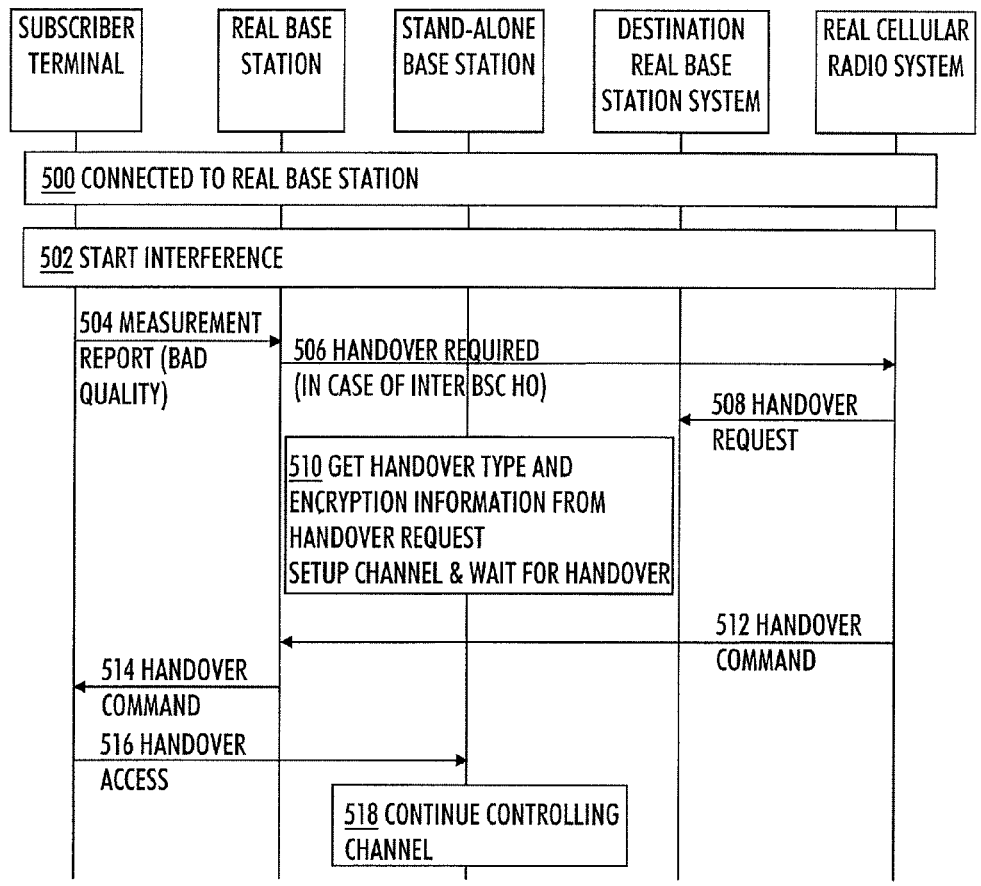

Next, a method for controlling a GSM mobile terminal will be described with reference to FIG. 5. FIG. 5 describes how to take control of a GSM mobile phone performing inter BSC-intra MSC handover as a part of the method. The same applies with little modifications to all different cell reselection cases. In this method, the encryption key capturer is connected to Abis interfaces of real base stations. Encryption keys and radio channel information are captured from signalling messages and sent to the controller via a packet data connection. The method starts in 500. As a prerequisite, steps 302, 304, 306 and 308 are executed to set up a stand-alone base station. In 500, the mobile terminal has a call connection with the real base station. During the call set up phase, the encryption key capturer has captured used encryption keys and has sent them to the controller. In 502, the interference transmitter interferes with the call connection so as to make the mobile terminal receive poor signal quality from the serving cell. In 504, the mobile terminal sends RR MEASUREMENT REPORT showing poor signal quality for the serving cell and good signal quality for the emulated cell. In 506, as a response to measurement reports, the real base station initiates handover to the cell masqueraded by the emulated cell by sending BSSMAP HANDOVER REQUIRED message to the MSC. In 508, the cellular radio system prepares handover with the masqueraded cell by sending it BSSMAP HANDOVER REQUEST. In 510, the encryption key capturer captures the BSSMAP HANDOVER REQUEST, and channel and encryption information captured by the encryption key capturer are used for setting up channels to stand-alone base station. In 512, the cellular radio system has completed the handover preparation and commands handover to the masqueraded cell by sending BSSMAP HANDOVER COMMAND MESSAGE. In 514, the serving base stations sends RR HANDOVER COMMAND message to the mobile terminal. In 516, the mobile terminal starts handover by sending a HANDOVER ACCESS burst to the emulated cell. In 518, a radio connection is established and the stand-alone base station continues the handover procedure by establishing channels and has control of the call.

Figure 6:
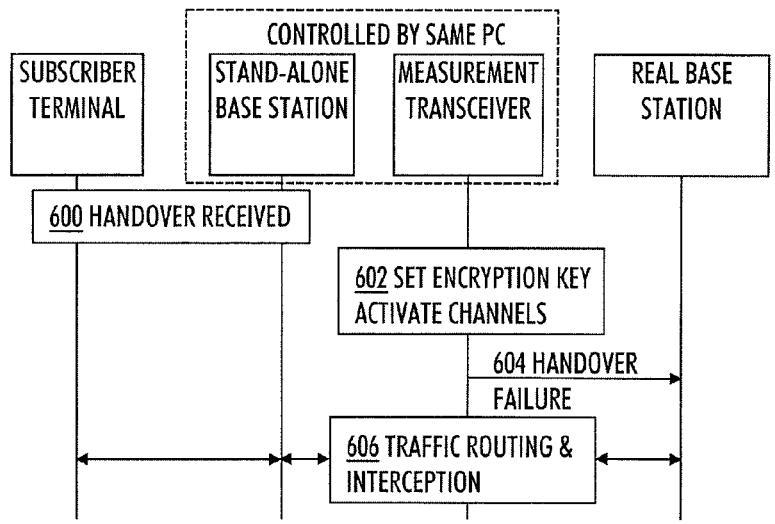

Next, a method for eavesdropping a call in the transferred ongoing radio connection will be described with reference to FIG. 6. The method begins in 600, wherein a radio connection is transferred to the emulated cell using handover. In 602, a channel and an encryption key used in subscriber terminal connection to the real base station are set up in a measurement transceiver, and the measurement transceiver sets up a radio connection to the real base station. In 604, the measurement transceiver sends RR HANDOVER failure to the real base station misleading the real cellular radio system to handle the measurement transceiver as the subscriber terminal. In 606, the user plane traffic received from call parties is intercepted and routed via the measurement transceiver and the stand-alone base station.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising a processor configured to cause the apparatus:
    to control a stand-alone base station so that an emulated cell of a cellular radio system is formed by transmitting a control channel with information of a real cell and with such transmission power that a subscriber terminal having an ongoing connection with a serving cell base station is caused to measure reception of the stand-alone base station as being better than reception of the serving cell base station;
    to control the stand-alone base station to perform cell reselection with the subscriber terminal so that the ongoing radio connection with the serving cell base station is transferred to continue with the stand-alone base station;
    to control a measurement transceiver to masquerade itself as the subscriber terminal, and to send a handover failure command to the serving cell base station;
    to intercept user plane traffic from the transferred ongoing radio connection; and
    to control the stand-alone base station and the measurement transceiver to route the user plane traffic of the transferred ongoing radio connection with the subscriber terminal.

2. The apparatus of claim 1, wherein the processor is further configured to cause the apparatus:
    to control an interference transmitter to interfere with the serving cell base station so that the subscriber terminal having the ongoing connection with the serving cell base station is caused to measure reception of the stand-alone base station as being better than reception of the serving cell base station.

3. The apparatus of claim 1, wherein the processor is further configured to cause the apparatus:
    to control an encryption key capturer to capture an encryption key of the ongoing radio connection between the subscriber terminal and the serving cell base station.

4. The apparatus of claim 1, wherein the processor is further configured to cause the apparatus:
    to control the stand-alone base station so that information transmitted in the control channel is modified to better force the subscriber terminal to perform the cell reselection in the emulated cell.

5. The apparatus of claim 1, wherein the processor is further configured to cause the apparatus:
    to control the measurement transceiver to measure real cells of the cellular radio system; and
    to select one of the measured real cells as the emulated cell.

6. The apparatus of claim 1, wherein the processor is further configured to cause the apparatus:
    to control a direction finder to find out the geographical location of the subscriber terminal utilizing the transferred ongoing radio connection with the subscriber terminal.

7. A method comprising:
    controlling a stand-alone base station so that an emulated cell of a cellular radio system is formed by transmitting a control channel with information of a real cell and with such transmission power that a subscriber terminal having an ongoing connection with a serving cell base station is caused to measure reception of the stand-alone base station as being better than reception of the serving cell base station;
    controlling the stand-alone base station to perform cell reselection with the subscriber terminal so that the ongoing radio connection with the serving cell base station is transferred to continue with the stand-alone base station;
    controlling a measurement transceiver to masquerade itself as the subscriber terminal, and to send a handover failure command to the serving cell base station;
    intercepting user plane traffic from the transferred ongoing radio connection; and
    controlling the stand-alone base station and the measurement transceiver to route the user plane traffic of the transferred ongoing radio connection with the subscriber terminal.

8. The method of claim 7, further comprising:
controlling an interference transmitter to interfere with the serving cell base station so that the subscriber terminal having the ongoing connection with the serving cell base station is caused to measure reception of the stand-alone base station as being better than reception of the serving cell base station.

9. The method of claim 7, further comprising:
controlling an encryption key capturer to capture an encryption key of the ongoing radio connection between the subscriber terminal and the serving cell base station.

10. The method of claim 7, further comprising:
controlling the stand-alone base station so that information transmitted in the control channel is modified to better force the subscriber terminal to perform the cell reselection in the emulated cell.

11. The method of claim 7, further comprising:
controlling the measurement transceiver to measure real cells of the cellular radio system; and
selecting one of the measured real cells as the emulated cell.

12. The method of claim 7, further comprising:
controlling a direction finder to find out the geographical location of the subscriber terminal utilizing the transferred ongoing radio connection with the subscriber terminal.

13. A computer-readable medium comprising computer program instructions which, when loaded into an apparatus, cause the apparatus to perform the following steps:
controlling a stand-alone base station so that an emulated cell of a cellular radio system is formed by transmitting a control channel with information of a real cell and with such transmission power that a subscriber terminal having an ongoing connection with a serving cell base station is caused to measure reception of the stand-alone base station as being better than reception of the serving cell base station;
controlling the stand-alone base station to perform cell reselection with the subscriber terminal so that the ongoing radio connection with the serving cell base station is transferred to continue with the stand-alone base station;
controlling a measurement transceiver to masquerade itself as the subscriber terminal, and to send a handover failure command to the serving cell base station;
intercepting user plane traffic from the transferred ongoing radio connection; and
controlling the stand-alone base station and the measurement transceiver to route the user plane traffic of the transferred ongoing radio connection with the subscriber terminal.

* * * * *